United States Patent
Wu et al.

(10) Patent No.: US 12,465,260 B2
(45) Date of Patent: Nov. 11, 2025

(54) SYSTEMS AND METHODS FOR CARDIAC CONDUCTION BLOCK

(71) Applicant: Presidio Medical, Inc., South San Francisco, CA (US)

(72) Inventors: Kenneth S. Wu, San Francisco, CA (US); Douglas Michael Ackermann, Reno, NV (US)

(73) Assignee: Presidio Medical, Inc., South San Francisco, CA (US)

( * ) Notice: Subject to any disclaimer, the term of this patent is extended or adjusted under 35 U.S.C. 154(b) by 602 days.

(21) Appl. No.: 16/968,531

(22) PCT Filed: Feb. 8, 2019

(86) PCT No.: PCT/US2019/017215
§ 371 (c)(1),
(2) Date: Aug. 7, 2020

(87) PCT Pub. No.: WO2019/157285
PCT Pub. Date: Aug. 15, 2019

(65) Prior Publication Data
US 2021/0038101 A1 Feb. 11, 2021

Related U.S. Application Data

(60) Provisional application No. 62/628,810, filed on Feb. 9, 2018.

(51) Int. Cl.
*A61B 18/14* (2006.01)
*A61B 5/283* (2021.01)
(Continued)

(52) U.S. Cl.
CPC .............. *A61B 5/283* (2021.01); *A61B 18/02* (2013.01); *A61B 18/1492* (2013.01);
(Continued)

(58) Field of Classification Search
CPC ...... A61B 5/283; A61B 18/02; A61B 18/1492
See application file for complete search history.

(56) References Cited

U.S. PATENT DOCUMENTS 4,057,069 A 11/1977 Dorffer et al.
4,917,093 A 4/1990 Dufresne et al.
(Continued)

FOREIGN PATENT DOCUMENTS

AU 2013273851 A1 1/2014
AU 2016201418 A1 * 3/2016
(Continued)

OTHER PUBLICATIONS

Office Action dated Dec. 19, 2022 in Japanese Application No. 2020-564790 in 12 pages.
(Continued)

*Primary Examiner* — Benjamin J Klein
*Assistant Examiner* — Thien Jason Tran
(74) *Attorney, Agent, or Firm* — Knobbe, Martens, Olson & Bear, LLP

(57) ABSTRACT

This disclosure relates to electrophysiology cardiac ablation devices, methods, and systems. In particular, this disclosure relates to devices, methods, and systems that create a reversible non-ablative blockade of cardiac tissue, test the cardiac tissue, and ablate the cardiac tissue.

23 Claims, 7 Drawing Sheets

(51) Int. Cl.
*A61B 18/00* (2006.01)
*A61B 18/02* (2006.01)

(52) U.S. Cl.
CPC ............ *A61B 2018/0022* (2013.01); *A61B 2018/00363* (2013.01); *A61B 2018/00386* (2013.01); *A61B 2018/00577* (2013.01); *A61B 2018/0212* (2013.01)

(56) References Cited

U.S. PATENT DOCUMENTS

| | | | |
|---|---|---|---|
| 5,034,589 A | 7/1991 | Evans et al. | |
| 5,833,714 A | 11/1998 | Loeb | |
| 5,868,743 A | 2/1999 | Saul et al. | |
| 6,139,545 A | 10/2000 | Utley et al. | |
| 6,189,536 B1 | 2/2001 | Martinez et al. | |
| 6,192,279 B1 | 2/2001 | Barreras et al. | |
| 6,205,359 B1 | 3/2001 | Bovega | |
| 6,293,266 B1 | 9/2001 | Oetting | |
| 6,366,813 B1 | 4/2002 | DiLorenzo | |
| 6,428,537 B1 | 8/2002 | Swanson et al. | |
| 6,442,424 B1* | 8/2002 | Ben-Haim | A61N 1/05 607/9 |
| 6,600,956 B2 | 7/2003 | Maschino et al. | |
| 6,671,561 B1 | 12/2003 | Moaddeb | |
| 6,819,956 B2 | 11/2004 | DiLorenzo | |
| 6,895,280 B2 | 5/2005 | Meadows et al. | |
| 6,907,295 B2 | 6/2005 | Gross et al. | |
| 6,937,893 B2 | 8/2005 | Danz et al. | |
| 6,974,533 B2 | 12/2005 | Zhou | |
| 6,975,907 B2 | 12/2005 | Zanakis et al. | |
| 7,079,903 B2 | 7/2006 | O'Brien | |
| 7,216,001 B2 | 5/2007 | Hacket et al. | |
| 7,421,299 B2 | 9/2008 | Frericks et al. | |
| 7,428,438 B2 | 9/2008 | Parramon et al. | |
| 7,437,193 B2 | 10/2008 | Parramon et al. | |
| 7,502,652 B2 | 3/2009 | Gaunt et al. | |
| 7,519,428 B1 | 4/2009 | Palmer | |
| 7,587,241 B2 | 9/2009 | Parramon et al. | |
| 7,638,032 B2 | 12/2009 | Zhou et al. | |
| 7,691,252 B2 | 4/2010 | Zhou et al. | |
| 7,742,828 B2 | 6/2010 | Gadsby et al. | |
| 7,780,833 B2 | 8/2010 | Hawkins et al. | |
| 7,881,808 B2 | 2/2011 | Borgaonkar et al. | |
| 7,891,085 B1 | 2/2011 | Kuzma et al. | |
| 7,909,764 B2 | 3/2011 | Wenzel et al. | |
| 8,019,439 B2 | 9/2011 | Kuzma et al. | |
| 8,034,229 B2 | 10/2011 | Zhou et al. | |
| 8,121,703 B1 | 2/2012 | Palmer | |
| 8,135,478 B2 | 3/2012 | Gross | |
| 8,271,098 B2 | 9/2012 | Swanson et al. | |
| 8,359,102 B2 | 1/2013 | Alataris et al. | |
| 8,406,886 B2 | 3/2013 | Gaunt et al. | |
| 8,417,352 B2 | 4/2013 | Carroll et al. | |
| 8,509,903 B2 | 8/2013 | York et al. | |
| 8,644,933 B2 | 2/2014 | Ozawa et al. | |
| 8,646,172 B2 | 2/2014 | Kuzma et al. | |
| 8,650,747 B2 | 2/2014 | Kuzma et al. | |
| 8,712,533 B2 | 4/2014 | Alataris et al. | |
| 8,768,472 B2 | 7/2014 | Fang et al. | |
| 8,792,988 B2 | 7/2014 | Alataris et al. | |
| 8,897,895 B2 | 11/2014 | Mashiach | |
| 8,948,881 B2 | 2/2015 | Fisk | |
| 8,983,614 B2 | 3/2015 | Kilgore et al. | |
| 9,008,780 B2 | 4/2015 | Nudo et al. | |
| 9,008,781 B2 | 4/2015 | Ahmed | |
| 9,008,800 B2 | 4/2015 | Ackermann et al. | |
| 9,011,310 B2 | 4/2015 | Ahmed | |
| 9,037,248 B2 | 5/2015 | Durand et al. | |
| 9,072,886 B2 | 7/2015 | Gaunt et al. | |
| 9,119,966 B2 | 9/2015 | Franke et al. | |
| 9,205,265 B2 | 12/2015 | Franke | |
| 9,283,391 B2 | 3/2016 | Ahmed | |
| 9,327,125 B2 | 5/2016 | Alataris et al. | |
| 9,333,356 B2 | 5/2016 | Franke et al. | |
| 9,333,357 B2 | 5/2016 | Alataris et al. | |
| 9,364,661 B2 | 6/2016 | Kilgore et al. | |
| 9,370,664 B2 | 6/2016 | Marnfeldt et al. | |
| 9,381,350 B2 | 7/2016 | Ahmed | |
| 9,384,990 B2 | 7/2016 | Musa | |
| 9,387,322 B2 | 7/2016 | Bhadra et al. | |
| 9,393,423 B2 | 7/2016 | Parramon et al. | |
| 9,403,014 B2 | 8/2016 | Kilgore et al. | |
| 9,480,842 B2 | 11/2016 | Alataris et al. | |
| 9,492,665 B2 | 11/2016 | Khalil et al. | |
| 9,498,621 B2 | 11/2016 | Ackermann et al. | |
| 9,572,979 B2 | 2/2017 | Fridman et al. | |
| 9,694,181 B2 | 7/2017 | Bhadra et al. | |
| 9,707,390 B2 | 7/2017 | Ahmed | |
| 9,707,391 B2 | 7/2017 | Ahmed | |
| 9,782,593 B2 | 10/2017 | Parramon et al. | |
| 9,789,329 B2 | 10/2017 | Ahmed | |
| 9,821,157 B2 | 11/2017 | Ahmed et al. | |
| 9,844,668 B2 | 12/2017 | Ahmed | |
| 9,889,291 B2 | 2/2018 | Bhadra et al. | |
| 10,071,241 B2 | 9/2018 | Bhadra et al. | |
| 10,195,434 B2 | 2/2019 | Bhadra et al. | |
| 10,272,240 B2 | 4/2019 | Ackermann et al. | |
| 10,307,595 B2 | 6/2019 | Shi et al. | |
| 10,441,782 B2 | 10/2019 | Bhadra et al. | |
| 11,027,126 B2 | 6/2021 | Ackermann et al. | |
| 11,730,964 B2 | 8/2023 | Faltys et al. | |
| 11,752,329 B2 | 9/2023 | Ackermann et al. | |
| 11,813,459 B2 | 11/2023 | Wu et al. | |
| 11,918,803 B2 | 3/2024 | Ackermann et al. | |
| 12,268,865 B2 | 4/2025 | Ackermann et al. | |
| 2002/0015963 A1 | 2/2002 | Keen | |
| 2003/0040785 A1 | 2/2003 | Maschino et al. | |
| 2004/0181261 A1 | 9/2004 | Manne | |
| 2004/0215285 A1 | 10/2004 | Pollock | |
| 2005/0075709 A1 | 4/2005 | Brennen et al. | |
| 2006/0085048 A1 | 4/2006 | Cory et al. | |
| 2006/0095088 A1 | 5/2006 | Ridder | |
| 2006/0167527 A1 | 7/2006 | Femano et al. | |
| 2006/0184211 A1 | 8/2006 | Gaunt et al. | |
| 2006/0265027 A1 | 11/2006 | Vaingast et al. | |
| 2007/0027490 A1 | 2/2007 | Ben-Haim et al. | |
| 2007/0043400 A1 | 2/2007 | Donders et al. | |
| 2007/0060815 A1 | 3/2007 | Martin et al. | |
| 2007/0073354 A1 | 3/2007 | Knudson et al. | |
| 2007/0083193 A1 | 4/2007 | Werneth et al. | |
| 2007/0255319 A1 | 11/2007 | Greenberg et al. | |
| 2007/0291522 A1 | 12/2007 | Toba et al. | |
| 2008/0208287 A1 | 8/2008 | Palermo et al. | |
| 2008/0208300 A1 | 8/2008 | Pasch et al. | |
| 2008/0275439 A1* | 11/2008 | Francischelli | A61B 18/1402 606/34 |
| 2009/0149797 A1 | 6/2009 | Dacey, Jr. et al. | |
| 2009/0192567 A1 | 7/2009 | Armstrong et al. | |
| 2009/0254148 A1 | 10/2009 | Borgens et al. | |
| 2010/0241190 A1 | 9/2010 | Kilgore et al. | |
| 2011/0021943 A1 | 1/2011 | Lacour et al. | |
| 2011/0071590 A1 | 3/2011 | Mounaim et al. | |
| 2011/0077660 A1 | 3/2011 | Janik et al. | |
| 2011/0093042 A1 | 4/2011 | Torgerson et al. | |
| 2011/0137381 A1 | 6/2011 | Lee et al. | |
| 2011/0160798 A1 | 6/2011 | Ackermann et al. | |
| 2011/0190849 A1 | 8/2011 | Faltys et al. | |
| 2011/0192720 A1 | 8/2011 | Blauw et al. | |
| 2011/0221438 A1 | 9/2011 | Goodwill et al. | |
| 2012/0016226 A1 | 1/2012 | Gertner | |
| 2012/0053510 A1 | 3/2012 | Peters et al. | |
| 2012/0239108 A1 | 9/2012 | Foutz et al. | |
| 2012/0277830 A1 | 11/2012 | Arfin et al. | |
| 2013/0035745 A1 | 2/2013 | Ahmed et al. | |
| 2013/0053922 A1 | 2/2013 | Ahmed et al. | |
| 2013/0184779 A1 | 7/2013 | Bikson et al. | |
| 2013/0238048 A1 | 9/2013 | Almendiger et al. | |
| 2013/0274842 A1 | 10/2013 | Guant et al. | |
| 2014/0031905 A1 | 1/2014 | Irazoqui et al. | |
| 2014/0119480 A1 | 5/2014 | Keegan | |
| 2014/0128865 A1* | 5/2014 | Gross | A61B 18/1492 606/41 |
| 2014/0135858 A1 | 5/2014 | Ahmed et al. | |

(56) References Cited

U.S. PATENT DOCUMENTS

| | | | |
|---|---|---|---|
| 2014/0228837 A1* | 8/2014 | Giovangrandi | A61N 1/06 606/41 |
| 2014/0324129 A1 | 10/2014 | Franke et al. | |
| 2015/0045675 A1 | 2/2015 | Chernomorsky | |
| 2015/0066108 A1 | 3/2015 | Shi et al. | |
| 2015/0073406 A1 | 3/2015 | Molsberger | |
| 2015/0165210 A1 | 6/2015 | Kilgore et al. | |
| 2015/0174397 A1 | 6/2015 | Bhadra et al. | |
| 2015/0182742 A1 | 7/2015 | Ackermann et al. | |
| 2015/0224326 A1* | 8/2015 | Toth | A61N 1/37205 600/377 |
| 2015/0238764 A1 | 8/2015 | Franke | |
| 2015/0258341 A1 | 9/2015 | Ternes et al. | |
| 2015/0293192 A1 | 10/2015 | Schmidt et al. | |
| 2015/0316499 A1 | 11/2015 | Jacks et al. | |
| 2016/0101286 A1 | 4/2016 | Bhadra et al. | |
| 2016/0144183 A1 | 5/2016 | Marnfeldt | |
| 2016/0158542 A1 | 6/2016 | Ahmed | |
| 2016/0235969 A1 | 8/2016 | Kilgore et al. | |
| 2016/0235990 A1 | 8/2016 | Mashiach | |
| 2016/0243353 A1 | 8/2016 | Ahmed | |
| 2016/0256689 A1 | 9/2016 | Vallejo et al. | |
| 2016/0263381 A1 | 9/2016 | Ahmed et al. | |
| 2016/0271392 A1 | 9/2016 | Vallejo et al. | |
| 2016/0271413 A1 | 9/2016 | Vallejo et al. | |
| 2016/0303379 A1 | 10/2016 | Ness et al. | |
| 2016/0331326 A1 | 11/2016 | Xiang et al. | |
| 2016/0346533 A1 | 12/2016 | Bhadra et al. | |
| 2017/0028192 A1 | 2/2017 | Ahmed et al. | |
| 2017/0050024 A1 | 2/2017 | Bhadra et al. | |
| 2017/0080244 A1 | 3/2017 | Chiel et al. | |
| 2017/0100591 A1 | 4/2017 | Nudo et al. | |
| 2017/0136235 A1 | 5/2017 | Molsberger | |
| 2017/0136243 A1 | 5/2017 | Lee et al. | |
| 2017/0281099 A1 | 10/2017 | Averina et al. | |
| 2017/0312505 A1 | 11/2017 | Ahmed | |
| 2017/0326370 A1 | 11/2017 | Grasse et al. | |
| 2018/0028824 A1 | 2/2018 | Pivonka et al. | |
| 2018/0161573 A1 | 6/2018 | Carbunaru et al. | |
| 2018/0256886 A1 | 9/2018 | Bhadra et al. | |
| 2018/0280691 A1 | 10/2018 | Ackermann et al. | |
| 2018/0361155 A1 | 12/2018 | Bhadra et al. | |
| 2019/0060640 A1 | 2/2019 | Bhadra et al. | |
| 2019/0167996 A1 | 6/2019 | Bhadra et al. | |
| 2019/0184160 A1 | 6/2019 | Franke et al. | |
| 2019/0184172 A1 | 6/2019 | Ardell et al. | |
| 2019/0184173 A1 | 6/2019 | Franke | |
| 2019/0269921 A1 | 9/2019 | Bhadra et al. | |
| 2019/0314630 A1 | 10/2019 | Ackermann et al. | |
| 2020/0001073 A1 | 1/2020 | Bhadra et al. | |
| 2020/0001087 A1 | 1/2020 | Parramon et al. | |
| 2020/0086114 A1 | 3/2020 | Willand et al. | |
| 2020/0129767 A1 | 4/2020 | Yoshida et al. | |
| 2022/0088374 A1 | 3/2022 | Ackermann et al. | |
| 2022/0096827 A1 | 3/2022 | Ackermann et al. | |
| 2022/0176130 A1 | 6/2022 | Wu et al. | |
| 2022/0409905 A1 | 12/2022 | Faltys et al. | |
| 2023/0008440 A1 | 1/2023 | Ackermann et al. | |
| 2024/0050751 A1 | 2/2024 | Flores et al. | |
| 2024/0181261 A1 | 6/2024 | Faltys et al. | |
| 2024/0198089 A1 | 6/2024 | Ackermann et al. | |
| 2024/0216694 A1 | 7/2024 | Wu et al. | |
| 2024/0226572 A1 | 7/2024 | Faltys et al. | |
| 2024/0299747 A1 | 9/2024 | Ackermann et al. | |

FOREIGN PATENT DOCUMENTS

| | | | |
|---|---|---|---|
| DE | 4324185 | 1/1995 | |
| EP | 0 281 717 | 9/1988 | |
| EP | 2 942 023 | 11/2015 | |
| EP | 1981589 B1 | 4/2016 | |
| JP | 63-318958 A | 12/1988 | |
| JP | 2009-529352 A | 8/2009 | |
| JP | 2016-529039 A | 9/2016 | |
| WO | WO 1998/15317 | 4/1998 | |
| WO | WO 2007/082382 | 7/2007 | |
| WO | WO 2008/048321 | 4/2008 | |
| WO | WO 2008/140376 | 11/2008 | |
| WO | WO 2010/042750 | 4/2010 | |
| WO | WO 2013/188753 | 12/2013 | |
| WO | WO 2015/142838 | 9/2015 | |
| WO | 2015/179744 A1 | 11/2015 | |
| WO | WO-2015170281 A1 * | 11/2015 | A61B 18/1492 |
| WO | WO 2017/044542 | 3/2017 | |
| WO | WO 2017/062272 | 4/2017 | |
| WO | WO 2017/106519 | 6/2017 | |
| WO | WO 2018/085611 | 5/2018 | |
| WO | WO 2018/187237 | 10/2018 | |
| WO | WO 2019/157285 | 8/2019 | |
| WO | WO 2019/164952 | 8/2019 | |
| WO | WO 2020/010020 | 1/2020 | |
| WO | WO 2021/102447 | 5/2021 | |
| WO | WO 2021/102448 | 5/2021 | |
| WO | WO 2022/251519 | 12/2022 | |
| WO | WO 2022/251520 | 12/2022 | |

OTHER PUBLICATIONS

International Search Report and Written Opinion in PCT Application No. PCT/US19/17215 mailed Jun. 20, 2019.

Ackermann, Jr, D. Michael, et al. "Separated interface nerve electrode prevents direct current induced nerve damage." Journal of neuroscience methods 201.1 (2011): 173-176.

Bhadra, Niloy, and Kevin L. Kilgore. "Direct current electrical conduction block of peripheral nerve." IEEE Transactions on Neural Systems and Rehabilitation Engineering 12.3 (2004): 313-324.

Borsook, David. "A future without chronic pain: neuroscience and clinical research." Cerebrum: the Dana forum on brain science. vol. 2012. Dana Foundation, 2012.

Brummer, S.B. et al. "Electrical Stimulation of the Nervous System: The Principle of Safe Charge Injection with Noble Metal Electrodes." Bioelectrochemistry and Bioenergetics 2: (1975) 13-25.

Bussel, Catelijne M., Dirk L. Stronks, and Frank JPM Huygen. "Successful treatment of intractable complex regional pain syndrome type I of the knee with dorsal root ganglion stimulation: a case report." Neuromodulation: Technology at the Neural Interface 18.1 (2015): 58-61.

Cogan, S.F., et al. "In Vitro Comparison of the Charge-Injection Limits of Activated Iridium Oxide (AIROF) and Platinum-Iridium Microelectrodes", IEEE Transactions on Biomedical Engineering, 52.9 (2005): 1612-1614.

Cogan, S.F., et al. "Potential-Biased, Asymmetric Waveforms for Charge-Injection With Activated Iridium Oxide (AIROF) Neural Stimulation Electrodes." 2006: 53(2): 327-332.

Donaldson et al. "When are actively balanced biphasic ('Lilly') stimulating pulses necessary in a neurological prosthesis?" Medical & Biological Engineering & Computing Jan. 1986: 24: 41-49.

Elbasiouny, S., et al. Modulation of motoneuronal firing behavior after spinal cord injury using intraspinal microstimulation current pulses: a modeling study. J. Appl. Physiol. 103 (2007) 276-286.

Fridman, Gene Y., and Charles C. Della Santina. "Safe direct current stimulation to expand capabilities of neural prostheses." IEEE Transactions on Neural Systems and Rehabilitation Engineering 21.2 (2013): 319-328.

Fridman, Gene Y., and Charles C. Della Santina. "Safe direct current stimulator 2: concept and design." In Engineering in Medicine and Biology Society (EMBC), 2013 35th Annual International Conference of the IEEE, pp. 3126-3129. IEEE, 2013.

Gabrielsson, Erik O., et al. "A four diode full wave ionic current rectifier based on bipolar membranes: Overcoming the limit of electrode capacity." Advanced Materials 26.30 (2014): 5143-5147.

Hasegawa, G., et al. "Impact of Electrolyte on Pseudocapacitance and Stability of Porous Titanium Nitride (TiN) Monolithic Electrode", Journal of The Electrochemical Society, 162.1 (2015): A77-A85.

Hollingworth, Milo, et al. "Single Electrode Deep Brain Stimulation with Dual Targeting at Dual Frequency for the Treatment of Chronic Pain: A Case Series and Review of the Literature." Brain sciences 7.1 (2017): 1-11.

(56) References Cited

OTHER PUBLICATIONS

Holtzheimer, Paul E., and Helen S. Mayberg. "Deep brain stimulation for psychiatric disorders." Annual review of neuroscience 34 (2011): 289-307.

Huang, C. et al. "Electrical stimulation of the auditory nerve: direct current measurement in vivo." IEEE Transactions on Biomed. Eng. vol. 46 No. 4 Apr. 1999 at 461-470.

Hurlbert, R. John. "Dose-response study of the pathologic effects of chronically applied direct current stimulation on the normal rat spinal cord." J. Neurosurg. 79 (Dec. 1993) 905-916.

Keifer, Orion Paul, Jonathan P. Riley, and Nicholas M. Boulis. "Deep brain stimulation for chronic pain: intracranial targets, clinical outcomes, and trial design considerations." Neurosurgery Clinics 25.4 (2014): 671-692.

Krum, Henry, et al. "Catheter-based renal sympathetic denervation for resistant hypertension: a multicentre safety and proof-of-principle cohort study." The Lancet 373.9671 (2009): 1275-1281.

Kim et al. "Electrochemical studies on the alternating current corrosion of mild steel under cathodic protection condition in marine environments", Electrochimica Acta 51, 2006, p. 5259-5267.

Kumsa, D et al. Electrical neurostimulation with imbalanced waveform mitigates dissolution of platinum Electrodes. J. Neural Eng. 13 (2016): 1-5.

Kumsa, D et al. Electrical neurostimulation with imbalanced waveform mitigates dissolution of platinum electrodes. Neural Eng. (2018) 13(5): 1-8.

Kumsa, D.W., et al. "Electron transfer processes occurring on platinum neural stimulating electrodes: pulsing experiments for cathodic-first, charge-imbalanced, biphasic pulses for $0.566 \leq k \leq 2.3$ in rat subcutaneous tissues", Journal of Neural Engineering, 16 (2019): 1-11.

McHardy, J., et al., "An Approach to Corrosion Control during Electrical Stimulation", Annals of Biomedical Engineering, 5 (1977): 144-149.

Mendell, Lorne M. "Constructing and deconstructing the gate theory of pain." PAIN® 155.2 (2014): 210-216.

Merrill, Daniel R., Marom Bikson, and John GR Jefferys. "Electrical stimulation of excitable tissue: design of efficacious and safe protocols." Journal of neuroscience methods 141.2 (2005): 171-198.

Mortimer, J.T., et al., "Intramuscular Electrical Stimulation: Tissue Damage", Annals of Biomedical Engineering, 8 (1980): 235-244.

Nahin, Richard L. "Estimates of pain prevalence and severity in adults: United States, 2012." The Journal of Pain 16.8 (2015): 769-780.

Nakajima, H., et al. "Cervical angina: a seemingly still neglected symptom of cervical spine disorder?" Spinal cord 44.8 (2006): 509-513.

Neupane, M et al. Study of Anodic Oxide Films of Titanium Fabricated by Voltammetric Technique in Phosphate Buffer Media. Int. J. Electrochem. Sci., 4 (2009) 197-207.

Nielsen et al., "AC-Corrosion and Electrical Equivalent Diagrams", in: Proceedings of 5th International Congress, CeoCo, bruxelles, Belgium, 2000.

Schaldach, M, Fractal Coated Leads: Adavanced Surface Technology of Genuiune Sensing and Pacing, Progress in Biomedical Research, (2000): 259-272.

Scheiner, A., et al., "Imbalanced Biphasic Electrical Stimulation: Muscle Tissue Damage", Annals of Biomedical Engineering, 18 (1990): 407-425.

Specht, H. et al., Electrochemical properties and stability of PVD coatings for the application in cardiac and neurological stimulation, (2006).

Tjepkema Cloostermans, Marleen C., et al. "Effect of burst stimulation evaluated in patients familiar with spinal cord stimulation." Neuromodulation: Technology at the Neural Interface 19.5 (2016): 492-497.

Yang, Fei, et al. "Differential expression of voltage-gated sodium channels in afferent neurons renders selective neural block by ionic direct current." Science advances 4.4 (2018): eaaq1438 in 10 pages.

International Preliminary Report on Patentability, re PCT Application No. PCT/US 19/17215, issued Aug. 11, 2020.

U.S. Appl. No. 18/421,709, filed Jan. 24, 2024.
U.S. Appl. No. 18/468,520, filed Sep. 15, 2023.
U.S. Appl. No. 18/465,043, filed Sep. 11, 2023.
U.S. Appl. No. 18/563,859, filed Nov. 22, 2023.
U.S. Appl. No. 18/563,861, filed Nov. 22, 2024.

Ajijola et al., "Neural Remodeling and Myocardial Infarction—The Stellate Ganglion as a Double Agent*", Journal of the American College of Cardiology, vol. 59, No. 10, pp. 962-964, 2012.

Clyburn et al., "What gets on the nerves of cardiac patients? Pathophysiological changes in cardiac innervation", J Physiol, vol. 600.3, pp. 451-461, 2022.

International Preliminary Report on Patentability dated Dec. 7, 2023 in Application No. PCT/US2022/031162 in 11 pages.

International Preliminary Report on Patentability issued Nov. 21, 2023 in Application No. PCT/US2022/031163 in 10 pages.

International Preliminary Report on Patentability, re PCT Application No. PCT/US18/025743, dated Oct. 17, 2019.

International Preliminary Report on Patentability, re PCT Application No. PCT/US19/018777, dated Sep. 3, 2020.

International Preliminary Report on Patentability, re PCT Application No. PCT/US19/040189, dated Jan. 14, 2021.

International Preliminary Report on Patentability, re PCT Application No. PCT/US20/062068, dated Jun. 2, 2022.

International Preliminary Report on Patentability, re PCT Application No. PCT/US20/062077, dated Jun. 2, 2022.

International Search Report and Written Opinion dated Oct. 18, 2022 in Application No. PCT/US2022/031162 in 20 pages.

International Search Report and Written Opinion dated Sep. 7, 2022 in Application No. PCT/US2022/031163 in 17 pages.

International Search Report and Written Opinion in PCT Application No. PCT/US2018/025743 dated Jun. 28, 2018 in 8 pages.

International Search Report and Written Opinion in PCT Application No. PCT/US2019/018777 dated Jun. 20, 2019 in 15 pages.

International Search Report and Written Opinion in PCT Application No. PCT/US2019/040189 dated Sep. 20, 2019 in 16 pages.

International Search Report and Written Opinion in PCT Application No. PCT/US2020/062077 dated Feb. 17, 2021 in 18 pages.

International Search Report and Written Opinion in PCT Application No. PCT/US2020/062068, mailed Apr. 8, 2021 in 20 pages.

Zaman et al., "Sudden Cardiac Death Early After Myocardial Infarction—Pathogenesis, Risk Stratification, and Primary Prevention", Circulation, vol. 129, pp. 2426-2435, Jun. 10, 2014.

Office Action dated Dec. 4, 2023 in Australian Application No. 2019216750 in 5 pages.

Notification of Filing Divisional Applications dated Mar. 27, 2024 in Chinese Application No. 201980023079.0 in 3 pages.

\* cited by examiner

SYSTEMS AND METHODS FOR CARDIAC CONDUCTION BLOCK

INCORPORATION BY REFERENCE TO ANY PRIORITY APPLICATIONS

This application the U.S. National Stage under 37 C.F.R. § 371 of PCT App. No. PCT/US2019/017215 filed Feb. 8, 2019 which in turn claims the benefit under 35 U.S.C. § 119(e) as a nonprovisional application of U.S. Prov. App. No. 62/628,810 filed on Feb. 9, 2018, which is hereby incorporated by reference in its entirety. Any and all applications for which a foreign or domestic priority claim is identified in the Application Data Sheet as filed with the present application are hereby incorporated by reference under 37 CFR 1.57.

FIELD

This disclosure relates to electrophysiology cardiac ablation devices, methods, and systems. In particular, this disclosure relates to devices, methods, and systems that create a blockade of cardiac tissue, test cardiac tissue, and ablate the cardiac tissue.

BACKGROUND

Electrophysiology (EP) cardiac ablation procedures currently require sequential ablation of the cardiac tissue, and then subsequent assessment of whether or not a particular ablation resulted in an alteration, reduction, or modification of aberrant cardiac activity, including an arrhythmia. This process often takes a long time (e.g. hours) and utilization of a procedure suite, and can result in unnecessary or non-therapeutic ablations of cardiac tissue, which generally does not regenerate.

SUMMARY

It is therefore desirable in some embodiments to provide a device and/or method to allow for testing whether a particular piece of cardiac tissue would be suitable for therapeutic vs. iatrogenic ablation (e.g., to reversibly test if ablation of given tissue would indeed be therapeutic prior to potentially permanently ablating the tissue). This can be performed by applying direct current and/or applying high frequency alternating current to cardiac tissue to create a non-ablative reversible blockade of cardiac tissue. A direct system and method can be implemented to prevent ablation upon application of direct current, thus preserving tissue.

Methods and apparatuses or devices disclosed herein each have several aspects, no single one of which is solely responsible for its desirable attributes. Without limiting the scope of this disclosure, for example, as expressed by the claims which follow, its more prominent features will now be discussed briefly.

In some configurations, disclosed herein is a method of performing a cardiac electrophysiologic study in a patient. The method can include sensing the electrical activity of a first cardiac target tissue; determining that the electrical activity of the first cardiac target tissue has characteristics of interest; delivering a first non-ablative direct current to the first cardiac target tissue sufficient to create a reversible conduction block in the first cardiac target tissue; and/or observing for the presence of the characteristics of interest following delivering the first non-ablative direct current.

In some configurations, the characteristics of interest comprise aberrant electrical activity. In some configurations, the method can also include ablating the first cardiac target tissue if the characteristics of interest are absent following delivering the first non-ablative direct current to the first cardiac target tissue. The method can also include sensing the electrical activity of a second cardiac target tissue; and determining that the electrical activity of the first cardiac target tissue has the characteristics of interest.

In some configurations, the method can also include delivering a second non-ablative direct current to the second cardiac target tissue sufficient to create a reversible conduction block in the second cardiac target tissue; and observing for the presence of the characteristics of interest following delivering the second non-ablative direct current.

In some configurations, the method can also include ablating the second cardiac target tissue if the pathologic arrhythmia is absent following delivering the second non-ablative direct current to the second cardiac target tissue.

In some configurations, the first non-ablative direct current can include cathodic direct current cycled with anodic direct current.

In some configurations, the first non-ablative direct current comprises a frequency of less than about 1 Hz, 0.5 Hz, 0.1 Hz, 0.05 Hz, 0.01 Hz, between about 0.01 Hz and 1 Hz, and ranges including any two of the foregoing values.

In some configurations, the first non-ablative direct current has an amplitude of less than about 100 mA, 50 mA, 20 mA, 10 mA, 5 mA, 1 mA, or less, or ranges including any two of the foregoing values.

In some configurations, the first cardiac target tissue comprises myocardium, endocardium, or epicardium. The first cardiac target tissue can include left and/or right atrial tissue; and/or left and/or right ventricular tissue. The first cardiac target tissue can also include pulmonary arterial or venous tissue.

In some configurations, the method is for treating an arrhythmia, including but not limited to atrial fibrillation, atrial flutter, PSVT, or ventricular tachycardia.

In some configurations, ablating the first cardiac target tissue comprises delivering ablative direct current.

In some configurations, ablating the first cardiac target tissue comprises delivering RF energy, microwave energy, ultrasound energy, cryoablation, thermal energy, and/or laser energy. In some configurations, ablating the first cardiac target tissue comprises delivering cryoablation.

In some configurations, disclosed is a method of performing a cardiac electrophysiologic study in a patient, including sensing the electrical activity of a first cardiac target tissue; delivering a first non-ablative electrical current to the first cardiac target tissue sufficient to create a reversible conduction block in the first cardiac target tissue; and observing for aberrant electrical activity of the patient's heart following delivering the first non-ablative electrical current. The non-ablative electrical current can include HFAC and/or direct current. The method can also include ablating the first cardiac target tissue if the aberrant electrical activity is absent following delivering the first non-ablative current to the first cardiac target tissue.

In some configurations, disclosed herein is an electrophysiology cardiac ablation system including a first generator configured to produce a non-ablative blocking electric current; a second generator configured to produce an ablative energy modality; and a catheter. The catheter has a proximal end configured to be coupled to the first generator and a second ablative reservoir that can be a second generator, and a distal end. The catheter can further include a conductor extending from a proximal zone of the catheter to a distal zone of the catheter. The conductor can be disposed inside the integrated catheter. The system can also include at least one blocking electrode disposed at a distal end of the catheter and configured to be conductively connected to the first generator; and at least one ablation end effector disposed at a distal end of the catheter and configured to be conductively connected to the second ablative reservoir, which could be, for example, an RF generator, ultrasonic generator, microwave generator, cryo reservoir, and the like. The system can also be configured to create a reversible block in cardiac tissue by delivering the blocking electric current from the first generator to the cardiac tissue via the at least one blocking electrode. The system can also be configured to ablate cardiac tissue by delivering the ablative energy modality from the second generator to the at least one ablation electrode.

In some configurations, the at least one blocking electrode comprises a high charge density material.

In some configurations, the at least one blocking electrode is made of silver and/or silver chloride, and/or titanium nitride.

In some configurations, the first generator is configured to generate non-ablative DC or HFAC.

In some configurations, the conductor comprises a wire.

In some configurations, at least one blocking electrode is configured to sense cardiac tissue activity.

In some configurations, the at least one ablation electrode covers the perimeter of a portion of the distal end of the catheter.

In some configurations, the at least one ablation electrode is an RF ablation electrode.

In some configurations, the catheter is flexible sufficient to allow contact between the at least one blocking electrode and the cardiac tissue.

In some configurations, the at least one blocking electrode is disposed on an expandable member such as a balloon that is disposed proximate the distal end of the integrated catheter, and the balloon is configured to be inflated such that the at least one blocking electrode can directly contact cardiac tissue.

In some configurations, disclosed herein is an electrophysiology cardiac ablation system, that can include a generator configured to produce a non-ablative blocking electric current; and a catheter. The catheter can include a proximal end configured to be coupled to the generator and a distal end. The catheter can include an internal lumen extending from a proximal zone of the integrated catheter to a distal zone of the integrated catheter, defining openings within the proximal zone and the distal zone. The internal lumen is configured to facilitate conductive fluid flowing from the proximal zone of the catheter to the distal zone of the catheter. The catheter can also include at least one ablation electrode disposed proximate the distal zone of the integrated catheter and configured to be conductively connected to the generator. The system can be configured to reversibly block cardiac tissue by delivering the non-ablative blocking current from the generator to cardiac tissue via the conductive fluid. The system can also be configured to ablate cardiac tissue by delivering current from the generator to the at least one ablation electrode. The conductive fluid can be a volume of conductive fluid that includes saline, for example, and be configured to carry a DC current to reversibly block the cardiac tissue. The ablation electrode could be, for example an RF electrode or another end effector, such as a microwave antenna, laser, cryo port, ultrasound transducer, or the like.

In some configurations, disclosed herein is an integrated catheter, including a proximal end configured to be coupled to a generator; a distal end; at least one blocking electrode disposed proximate a distal end of the integrated catheter and configured to conductively connect to the generator; and at least one ablation electrode disposed proximate a distal end of the integrated catheter and configured to conductively connect to the generator. The integrated catheter is configured to block cardiac tissue by delivering a blocking current from the generator to cardiac tissue via the at least one blocking electrode; and configured to ablate cardiac tissue by delivering current from the generator to the at least one ablation electrode. In some embodiments, at least one of the electrodes is configured to sense cardiac tissue activity. The sensing electrode could be integrated with the ablation end effector and/or non-ablative current electrode, or a discrete electrode in some embodiments.

BRIEF DESCRIPTION OF THE DRAWINGS

In the following detailed description, reference is made to the accompanying drawings, which form a part thereof. In the drawings, similar symbols typically identify similar components, unless context dictates otherwise. Thus, in some embodiments, part numbers may be used for similar components in multiple figures, or part numbers may vary depending from figure to figure. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and made part of this disclosure.

DETAILED DESCRIPTION

Figure 1A:
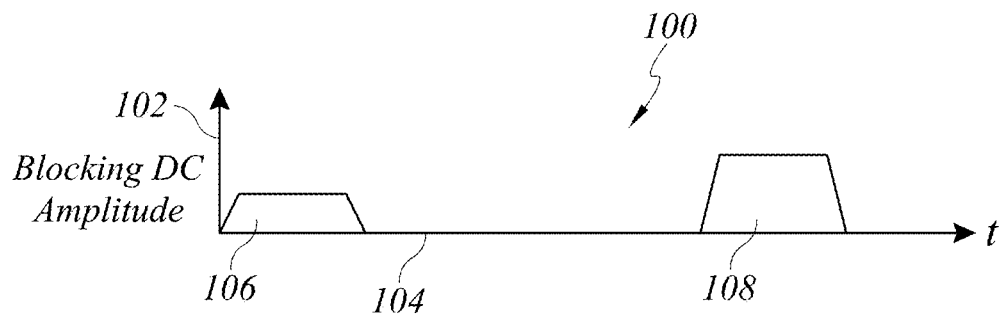
FIG. 1A illustrates an exemplary graph depicting blocking DC amplitudes as a function of time.

Although certain embodiments and examples are described below, this disclosure extends beyond the specifically disclosed embodiments and/or uses and obvious modifications and equivalents thereof. Thus, it is intended that the scope of this disclosure should not be limited by any particular embodiments described below.

Applying direct current (DC) can advantageously create a reversible, non-ablative blockade of cardiac tissue. Not to be limited by theory, DC can advantageously inactivate sodium channels, causing a robust block of tissue at low amplitudes. Furthermore, DC can also cause continuous inward ion current flow (ions such as calcium, sodium or potassium), causing a robust block of tissue at low amplitudes. Alternatively or in addition, high frequency alternating current (AC) can be applied to create a reversible blockade of cardiac tissue. In some embodiments, high frequency AC can be applied in conjunction with DC. This can be in contrast to utilizing DC for conventional ablation of tissue (or defibrillation of tissue). Some embodiments involve systems and electrodes for safely delivering blocking direct current (DC) to non-neural tissue, e.g., cardiac tissue by delivering cycled cathodic and anodic current through a high-charge chemistry.

Not to be limited by theory, the propagation of action potentials in non-neural tissue, e.g. cardiac tissue, leads to refractory periods on the order of milliseconds for sodium channels, typically 1-20 ms for the combined absolute and relative refractory periods, thus very low frequency AC current waveforms with half periods meaningfully greater than this refractory period (e.g., greater than about 50 ms) can also be used to create tissue blockade, and will be perceived by cardiac tissue as a direct current stimulus. As such, direct current as defined herein is inclusive of low frequency AC current waveforms that are perceived as and functionally is direct current from the perspective of the tissue whose action potentials are being modulated. The frequency could be, for example, less than about 1 Hz, 0.5 Hz, 0.1 Hz, 0.05 Hz, 0.01 Hz, 0.005 Hz, 0.0001 Hz, or ranges including any two of the foregoing values so long as the direction of current flow is constant over at least the entire refractory period of the target cardiac tissue.

Direct current has been utilized to block neural tissue, including brain tissue, central nerves, and peripheral nerves, including but not limited to the somatic and autonomic (e.g., sympathetic and parasympathetic nervous system). In some embodiments as described herein, non-neural, electrically excitable/conductable tissue can be advantageously treated to create a reversible blockade, including myocardial tissue.

In some embodiments, one or more portions of the conduction system of the heart including the SA node, AV node, bundle of His, left bundle, right bundle, Bachmann's bundle, anatomic variant accessory pathways, e.g., bundle of Kent, or the Purkinje fibers can be reversibly treated with non-ablative DC and/or HFAC. In some embodiments, treatment does not include one, or all of the aforementioned portions of the conduction system of the heart. Alternatively or in addition, cardiac tissue, e.g., myocardial tissue that is not part of the electrical conduction system of the heart as described above can be treated with systems and methods as disclosed herein.

A direct current system and method can be implemented to prevent ablation upon application of DC (thus preserving the tissue). This can facilitate testing whether a particular piece/zone of cardiac tissue would be suitable for therapeutic vs. iatrogenic ablation (e.g., to reversibly test if ablation of given tissue would indeed be therapeutic).

Subsequent ablation can be conducted on tissue, including but not limited to electromagnetic energy delivery (e.g., RF, microwave, ultrasound, laser, and/or magnetic energy), thermal ablation, cryoablation, chemical ablation, mechanical ablation (e.g., the Maze procedure), combinations thereof, and the like. In some embodiments, ablative DC may also be used to ablate or otherwise permanently alter tissue (e.g., a much higher intensity DC than used for reversible blockade that creates heat and/or damaging/ablative electrochemical species, or through an alternative electrode).

DC current used to create a temporary block of cardiac tissue can have a dramatically lower amplitude compared to that which results in ablation. For example, 0.1-20 mA, 0.1-5 mA, 0.1-10 mA, 1.0-10 mA, 5-20 mA, 10-20 mA, 5-50 mA, or 20-100 mA can be used to temporarily block cardiac tissue, or less than about 100 mA, 50 mA, 20 mA, 10 mA, 5 mA, 1 mA, 0.5 mA, 0.1 mA, or even less, or ranges including any two of the foregoing values. The systems described herein may facilitate the safe, non-ablative, delivery of DC in these ranges. The amplitude of the DC may be ramped up or down in some cases, including non-linear ramping functions. In some embodiments, the duration of DC delivery can only be applied during the period which a practitioner wishes to create a blockade (e.g. a simulated ablation). In some embodiments, any delivery or interphase period could be, for example, at least about, about, or no more than about 1, 5, 10, 15, 20, 25, 30, 35, 40, 45, 50, 55, 60, or more seconds, 1, 2, 3, 4, 5, 10, 15, 20, 25, 30, 35, 40, 45, 50, 55, 60, or more minutes, or ranges including any two of the foregoing values.

In some embodiments, high frequency as used herein with reference to alternating current (e.g., HFAC), can refer to frequencies of about 1 kHz or higher, such as between about 1.5 kHz and about 100 kHz, between about 3 kHz and about 50 kHz, between about 5 kHz and about 20 kHz, about 1 kHz, 2 kHz, 3 kHz, 5 kHz, 10 kHz, 15 kHz, 20 kHz, 25 kHz, 30 kHz, 40 kHz, 50 kHz, 75 kHz, 100 kHz, or more, or ranges including any two of the foregoing values. In some embodiments, the amplitude of the signal can range from about 0.1 mA to about 20 mA, from about 0.5 mA to about 10 mA, about 0.5 mA to about 4 mA, about 0.5 mA to about 2.5 mA, or other ranges including any two of the foregoing values, or other amplitudes as disclosed elsewhere herein. The amplitude of the applied signal can be ramped up and/or down in some cases, including non-linear ramping functions. The frequency or amplitude of the alternating current may also be modulated.

In reference to the Figures disclosed herein, blocking device(s) may be discrete from/separated from the ablation device(s). In some embodiments, blocking device(s) and ablation device(s) can be integrated. Example systems include, but are not limited to, those depicted in the Figures disclosed herein.

Figure 1B:
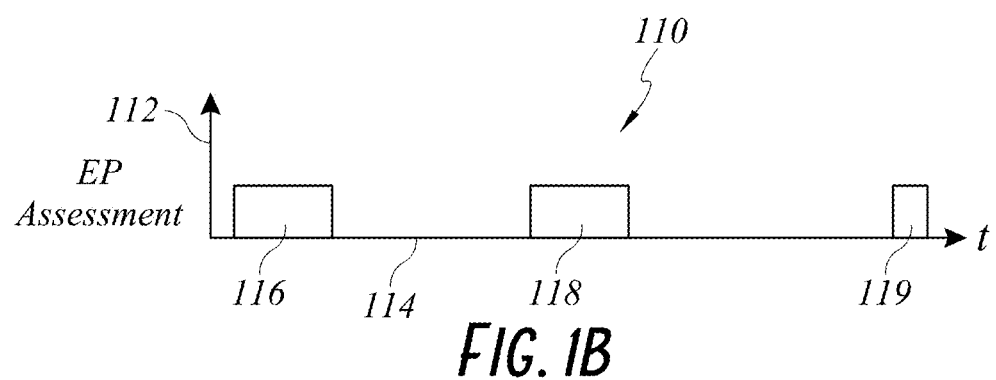
FIG. 1B illustrates an exemplary graph depicting EP assessments testing for the efficacy of a DC blockade on cardiac tissue as a function of time.
Figure 1C:
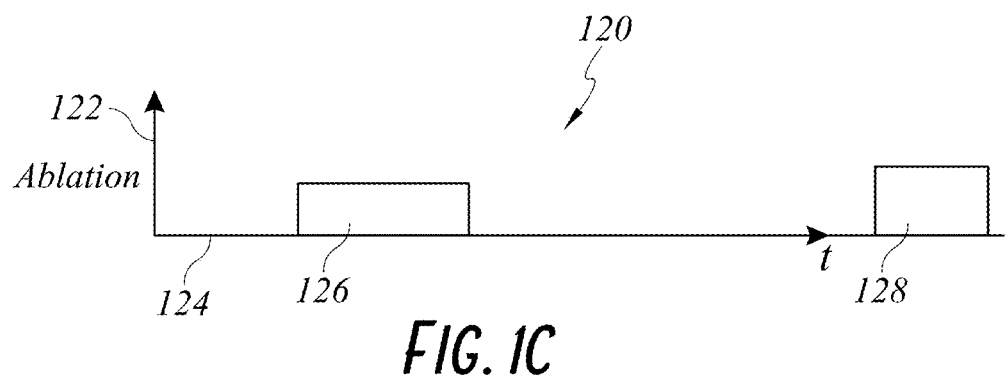
FIG. 1C illustrates an exemplary graph depicting ablation applied to cardiac tissue as a function of time.

In reference to FIGS. 1A-1C, blocking DC may be applied alternatively with ablative modalities, including but not limited to RF (or other ablative techniques) to guide the depth of ablation or area of therapeutic ablation of tissue, which may be more tissue-sparing or faster than ablation without the use of blocking DC.

FIG. 1A illustrates an exemplary graph 100 depicting blocking DC amplitudes as a function of time as applied to cardiac tissue. The vertical axis 102 is the blocking DC amplitude metric. The horizontal axis 104 is time. Blocking DC amplitude 106 is disposed when time equals zero. Blocking DC amplitude 108 is disposed at a subsequent time. Blocking DC amplitude 108 can be a higher DC amplitude than blocking DC amplitude 106. In some embodiments, blocking DC amplitude 108 can have the same or smaller amplitude as blocking DC amplitude 106.

FIG. 1B illustrates an exemplary graph 110 depicting EP assessments testing for the efficacy of a DC blockade applied to cardiac tissue as a function of time. The vertical axis 112 is the EP assessment metric. The horizontal axis 114 is time. A first test of efficacy 116 of the blockade occurs after time is zero and the blocking DC has been applied to the cardiac tissue. A second test of efficacy 118 occurs at some time after the time associated with the first test of efficacy 116. A third test (and subsequent) of efficacy 119 occurs at some time after the time associated with the second test of efficacy 118.

FIG. 1C illustrates an exemplary graph 120 depicting ablation as a function of time. The vertical axis 122 is the ablation metric. The horizontal axis 124 is time. A first ablation 126 is applied at a time subsequent to the first test of efficacy 116 in FIG. 1B. Second ablation 128 is applied at a subsequent time to the first ablation 126. Ablation metric 128 can be a higher or lower ablation metric compared with ablation metric 126. In some embodiments, ablation metric 128 can have the same or smaller amplitude than ablation metric 126.

In some embodiments, additional ablations, such as $3^{rd}$, $4^{th}$, $5^{th}$, and subsequent ablations can also occur. In some embodiments, a plurality of assessments/tests, such as about or at least about 2, 3, 4, 5, or more assessments/tests (e.g., observing for the presence of a characteristic of interest, such as a pathologic arrhythmia and/or aberrant electrical activity, and application of non-ablative blocking current) can occur before or after an ablation event. In some embodiments, at least one, two, or more ablation events, such as about or at least 2, 3, 4, 5, or more ablation events, can occur after an assessment. In some embodiments, only assessments/tests are performed during the procedure without any ablation events, including when no clear etiology for patient symptoms are identified.

Figure 2:
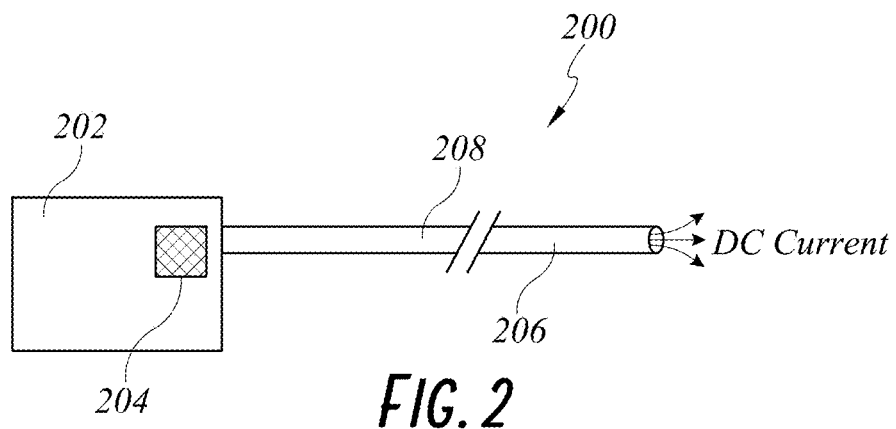
FIG. 2 schematically illustrates an example EP cardiac ablation system using conductive fluid.

FIG. 2 displays an example system 200 with a fluid catheter coupled to an external generator. System 200 can have a generator 202. In some embodiments, the generator 202 can supply DC current. In some embodiments, the generator 202 can supply AC current, such as HFAC. The generator 202 can have a cathode (and/or anode) conductor 204. The generator can include a return anode and/or cathode (e.g., a patch electrode placed on the skin of the patient).

The generator 202 can be configured to couple to a catheter 206. The catheter 206 can have a proximal end and a distal end. In some embodiments, the generator 202 can be releasably coupled to the proximal end of the catheter 206.

The catheter 206 can be an elongate tube. The catheter 206 can have an internal cavity that extends from the proximal end to the distal end of catheter 206 (or from other distances partially along the catheter 206 to or proximate the distal end of the catheter 206). The catheter 206 can have an outer diameter of varying sizes. The internal cavity can define an inner diameter of catheter 206 of varying sizes. The catheter 206 can be varying lengths that extend from the proximal end to the distal end of catheter 206.

The internal cavity of catheter 206 can be configured to hold a conductive fluid 208. In some embodiments, the conductive fluid 208 can be saline and/or another suitable fluid. In some embodiments, the generator 202 can produce an electrical current that flows through conductive fluid 208.

The internal cavity of catheter 206 can be configured to carry the conductive fluid 208 from a proximal zone to an opening or openings within a distal zone, including one or more openings along the sidewalls of an elongate, e.g., tubular structure. In some embodiments, the openings are arcuate such as circular, oval, or other apertures, but could also include partially circumferential, longitudinal or spiral slots, and/or other geometries. The distal end of the catheter 206 can be positioned through anatomical lumens inside a patient such that the distal end of the catheter 206 is adjacent to cardiac tissue. Once positioned, the generator 202 can generate a current that is carried through the conductive fluid 208. The conductive fluid 208 can be carried from the proximal zone to the distal zone of catheter 206 and, ultimately, make direct contact, or at least electrical contact with the cardiac tissue of a patient.

The catheter 206 can be made of varying materials that are conducive for carrying charged conductive fluid 208 and/or being inserted into the body of a patient.

Figure 3:
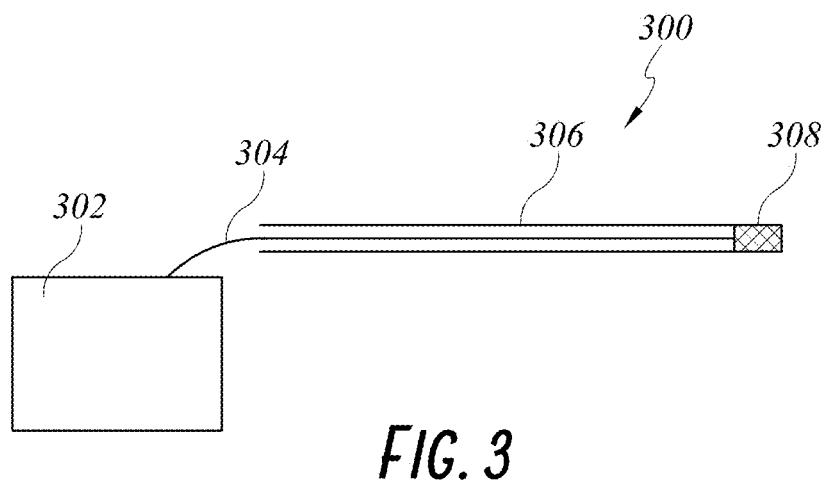
FIG. 3 schematically illustrates an example EP cardiac ablation system using a non-fluid conductor.

FIG. 3 displays an example system 300 for using an electrode at a distal end of a catheter. Example system 300 can have a generator 302. Generator 302 can have the characteristics of generator 202.

Generator 302 can be configured to couple to a catheter 306. Catheter 306 can have the characteristics of catheter 206. Catheter 306 can have a non-fluid conductor 304 disposed within catheter 306. In some embodiments, the non-fluid conductor 304 is a wire. In some embodiments, the generator 302 can be coupled to the non-fluid conductor 304.

The catheter 306 can have an electrode 308 disposed at or near the distal end of catheter 306. In some embodiments, the electrode 308 is a non-ablative DC electrode. In some embodiments, the electrode 308 can apply DC and/or AC (e.g., HFAC) current. In some embodiments, the electrode 306 is configured to apply a non-ablative electrical current to the cardiac tissue of a patient. In some embodiments, the electrode 308 surrounds all or part of the outer perimeter of catheter 306. In some embodiments, electrode 308 includes multiple electrodes.

Electrode 308 can be made of a variety of materials. In some embodiments, electrode 308 can be made of silver (Ag) and/or silver chloride (AgCl). In some embodiments, electrode 308 can be made of titanium nitride (TiN). In some embodiments, electrode 308 can be made of carbon (C). In some embodiments, the electrode 308 has an ion-selective coating or membrane. In some embodiments, the electrode 308 does not have an ion-selective coating or membrane.

In some embodiments, an electrode can include a contact comprising a high charge-capacity material. The electrode contact can have in some cases a geometric surface area of between about 1 mm$^2$ and about 10 mm$^2$, or about 1 mm$^2$, 2 mm$^2$, 3 mm$^2$, 4 mm$^2$, 5 mm$^2$, 6 mm$^2$, 7 mm$^2$, 8 mm$^2$, 9 mm$^2$, 10 mm$^2$, 20 mm$^2$, 50 mm$^2$, 100 mm$^2$, or ranges including any two of the foregoing values. The electrode contact itself can be fabricated of a high charge capacity material, such as those described, for example, in U.S. Pat. No. 10,071,241 to Bhadra et al., which is hereby incorporated by reference in its entirety. Alternatively, the electrode contact can comprise a base at least partially, or entirely coated with a high charge capacity material. In some embodiments, a high charge capacity material can have a Q value of at least about 25, 50, 100, 200, 300, 400, 500, 1,000, 2,500, 5,000, 10,000, 50,000, 1000,000, 500,000, or more $\mu C$, or ranges including any two of the foregoing values. The Q value of an electrode contact can refer to the total amount of charge that can be delivered through an electrode contact before the electrode contact begins having irreversible chemical reactions, such as oxygen or hydrogen evolution, or dissolution of the electrode materials. Non-limiting examples of high charge capacity materials are platinum black, iridium oxide, titanium nitride, tantalum, silver chloride, poly(ethylenedioxythiophene) and suitable combinations thereof. The electrodes could be fractal coated electrodes in some embodiments. To generate more surface area for the electrochemical reactions to occur, the traditional electrodes may be made from high surface area to volume structures such as roughened surfaces, woven surfaces, patterned surfaces, reticulated foam structures, porous sintered bead structures, nano- or micro-patterned structures to expose additional material surface area. In some embodiments, the electrode can be a SINE (separated-interface nerve electrode) or EICCC (electron to ion current conversion cell) electrode in which an electrode is immersed in an electrolyte solution which is in contact with an ion-conductive material-electrolyte solution interface with an ion-conductive material that electrically contacts the cardiac tissue or area proximal to cardiac tissue, as described, for example, in U.S. Pat. No. 9,008,800 to Ackermann et al., and U.S. Pub. No. 2018/0280691 to Ackermann et al., which is hereby incorporated by reference in their entireties.

In some embodiments, the system could include a silver and/or silver chloride electrode, such as described, for example in U.S. Pub. No. 2018/0280691 to Ackermann et al., which is hereby incorporated by reference in its entirety. A system for cardiac tissue block of a patient can in some cases utilize a renewable electrode. The system can include a direct current generator, and/or at least one electrode comprising silver chloride. The system can also include a controller configured to signal the direct current generator to deliver a first direct current with a first polarity through the electrode sufficient to block conduction in cardiac tissue, and/or decrease an amount of the silver chloride in the electrode thereby forming solid silver and chloride ions. The controller can also be configured to signal the direct current generator to deliver a second direct current with a second polarity through the electrode sufficient to increase the amount of the silver chloride, thereby renewing the electrode. The system can also include a cardiac tissue interface spaced apart from the electrode by a selective barrier. The selective barrier can also be configured to allow particular ions, e.g., chloride ions, through the barrier toward the cardiac tissue interface to block the cardiac tissue. The system can also include a sensor configured to determine whether a reaction, such as a predominantly silver/silver chloride reaction is occurring. The controller can be further configured to receive data from the sensor and discontinue or modulate at least one of the first direct current signal or the second direct current signal when undesirable activity is occurring, such as water being electrolyzed. The selective barrier can be further configured to prevent silver ions from passing through the barrier toward the cardiac tissue interface. The electrode can be housed in an insulated enclosure. The selective barrier can include an ion exchange membrane, and/or a hydrogel. The system can be devoid of any mechanically moving parts in some cases. The controller can be configured to deliver the first direct current such that the amount of silver chloride decreased is greater than a surface area of the electrode prior to delivery of the first direct current. The controller can also be configured to deliver the first direct current such that the amount of silver chloride decreased is greater than, such as about 1.25×, 1.5×, 2×, 3×, 4×, 5×, 10×, 15×, 20×, 50×, 100×, 1,000×, 5,000×, 10,000×, or more an amount capable of evenly covering a surface area, such as the entire functional surface area of the electrode prior to delivery of the first direct current, or ranges including any two of the aforementioned values.

The distal end of catheter 306 and electrode 308 can be positioned adjacent to cardiac tissue. The generator 202 can generate a current that is carried through the non-fluid conductor 304 to the electrode 308. Current can pass from electrode 308 to targeted cardiac tissue.

Figure 4:
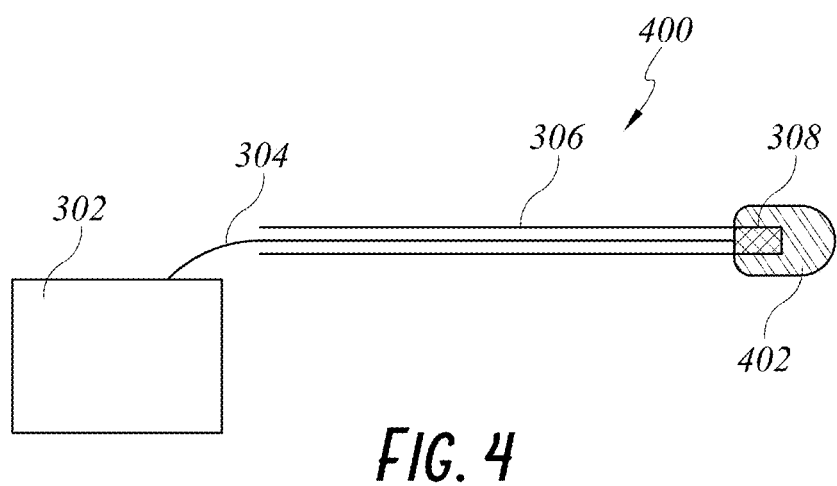
FIG. 4 schematically illustrates an example EP cardiac ablation system using a non-fluid conductor and a particulate container.

FIG. 4 displays an example system 400 that can employ an Ag and/or AgCl electrode for use without an ion-selective coating. System 400 can have a generator 302. System 400 can include a catheter 306.

In some embodiments, the electrode 308 can be made of Ag and/or AgCl and used without an ion-selective coating. This configuration can be suitable for temporary use because Ag dissolution will be minimal during the period of an ablation procedure.

A particulate container 402 can be positioned around electrode 308. In some embodiments, particulate container 402 can be a sponge, basket, mesh, and/or some other similar device to prevent particulate from escaping. In some embodiments, no particulate container 402 is positioned around electrode 308. Particulate container 402 can be made of a variety of materials that are conducive for surrounding electrode 308 and catching particulate that may separate from electrode 308.

Figure 5A:
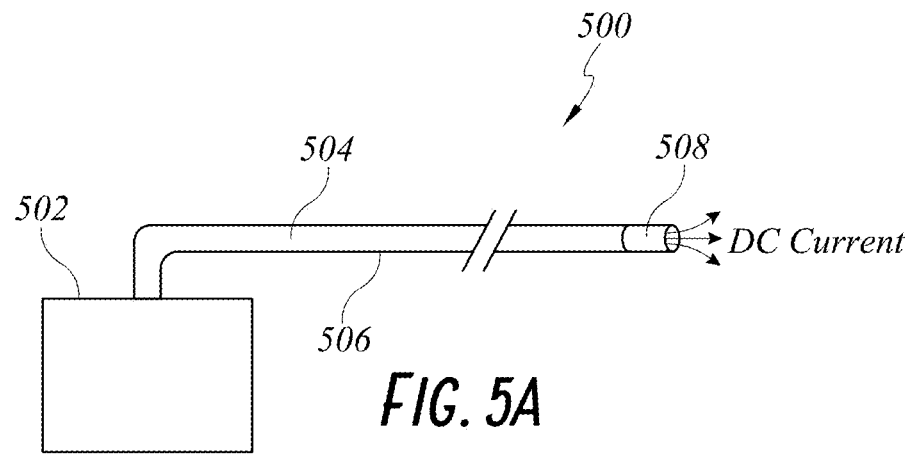
FIG. 5A schematically illustrates an example EP cardiac ablation system using an integrated catheter and conductive fluid.

FIG. 5A displays an example system 500 for an integrated blocking and ablation catheter. In some embodiments, the blocking is performed with DC and/or AC current. In some embodiments, ablation is performed with RF ablation or another suitable ablation technique such as thermal or cryoablation, or others such as those disclosed elsewhere herein. This configuration can be incorporated in any of the delivery techniques disclosed herein.

System 500 can include a generator 502. Generator 502 can have the characteristics of other generators disclosed herein. The generator 502 can be coupled to a proximal end of catheter 506. The catheter 506 can have the characteristics of other catheters disclosed herein. Conductive fluid 504 can flow through catheter 506—from the proximal end to an opening in the distal end. A current generated by the generator 502 can be carried by the conductive fluid 504 from the proximal end to the distal end of catheter 506. Charged conductive fluid 504 can be applied to cardiac tissue.

An electrode 508 can be positioned on the distal end of catheter 506. The electrode 508 can be an RF ablation electrode. In some embodiments, the electrode 508 can be another suitable ablation electrode, such as one that would facilitate thermal or cryoablation. In some embodiments, the electrode 508 is conductively connected to the generator 502 such that a generated current can flow to the electrode 508. Electrode 508 can be made of a variety of materials. Electrode 508 can have characteristics of other electrode disclosed herein.

Figure 5B:
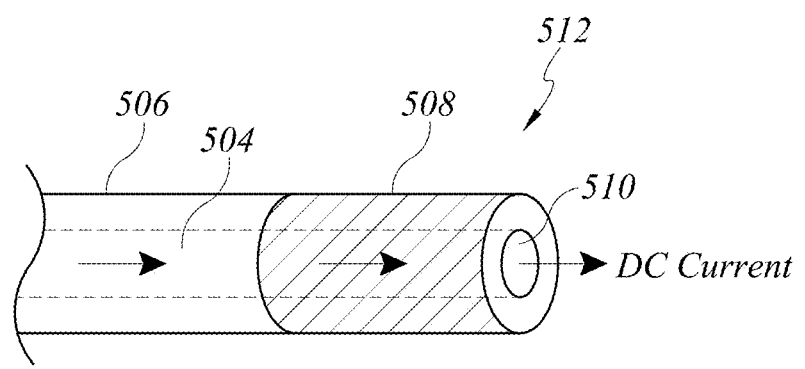
FIG. 5B schematically illustrates an example EP cardiac ablation system using an integrated catheter and conductive fluid.

FIG. 5B displays a partial view 512 of the system 500. The conductive fluid 504 can flow out distal or side opening 510 to exit the internal cavity of catheter 506.

The configuration described above in reference to FIGS. 5A and 5B can be advantageous because the blocking and ablation delivery are integrated into the same catheter. This configuration can facilitate testing with blocking current and ablation of the identical cardiac tissue (e.g., which would otherwise be difficult to do using two or more catheters). This configuration can increase the speed of EP cardiac ablation procedures. In some embodiments, conductive fluid 504 may serve the functions of both current conduction for non-ablative blockade, and also temperature regulation during a peri-ablation period (e.g. by cooling the system after a heat event caused by RF ablation).

Figure 6A:
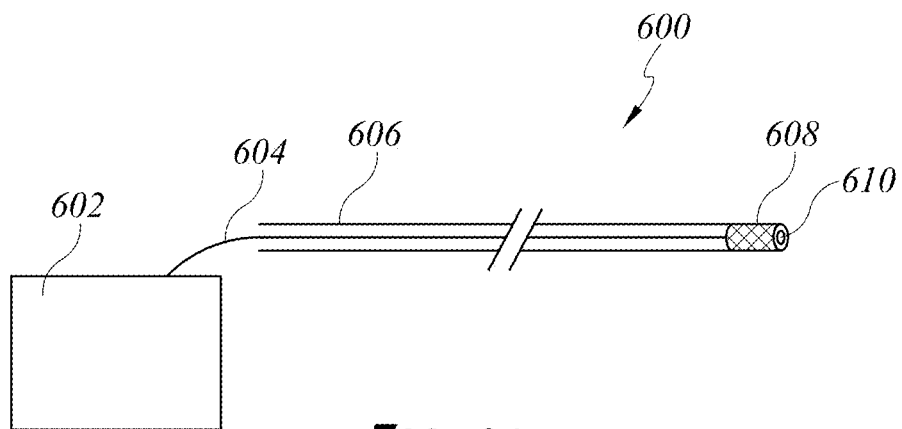
FIG. 6A schematically illustrates an example EP cardiac ablation system using an integrated catheter and non-fluid conductor.

FIG. 6A displays an example system 600 for an integrated blocking and ablation catheter. Example system 600 can include a generator 602. Generator 602 can have the characteristics of other generators disclosed herein.

Generator 602 can be coupled to a catheter 606. Catheter 606 can have the characteristics of other catheters disclosed herein. The catheter 606 can have a non-fluid conductor 604 that is configured to carry a current from the generator 602 to the distal end of catheter 606. The distal end of catheter 606 can have an opening that exposes an electrode core 610. In some embodiments, the electrode core 610 is a non-ablative DC electrode. In some embodiments, the electrode core 610 is made of Ag and/or AgCl. In some embodiments, the electrode core is made of another conductive material. A current can be carried from the generator 602 through the non-fluid conductor 604 and applied to the cardiac tissue of a patient via the electrode core 610.

A distal end of catheter 606 can have an electrode 608. Electrode 608 can have characteristics of other electrodes disclosed herein. In some embodiments, the electrode 608 is an RF ablation electrode. Electrode 608 can be conductively connected to the generator 602 such that a generated current can flow from the generator 602 to the generator 602.

Figure 6B:
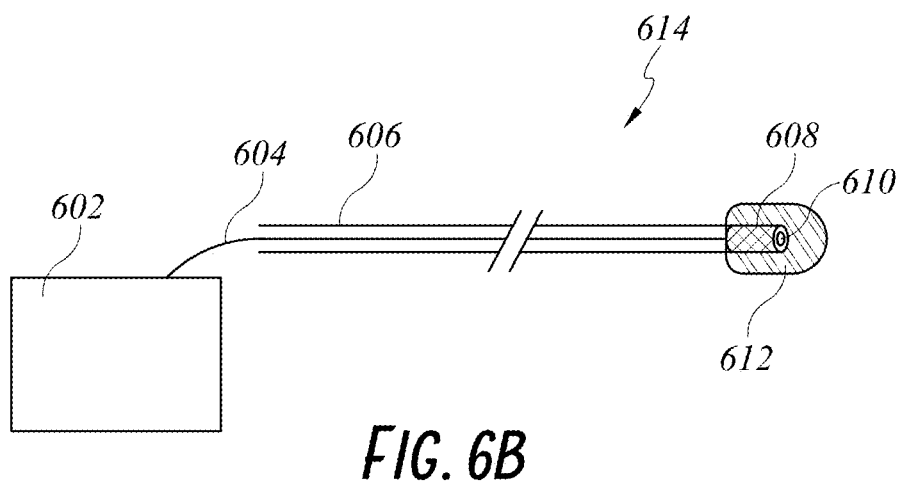
FIG. 6B schematically illustrates an example EP cardiac ablation system using an integrated catheter, non-fluid conductor, and particulate container.

FIG. 6B displays an example system 614 that includes an integrated blocking and ablation catheter with a particulate container. A particulate container 612 can be disposed around the electrode 608. In some embodiments, the entire electrode 608 is covered by the particulate container 612. The particulate container 612 can be a mesh, sponge, basket, and/or some other device that prevents the escape of particulate.

The configuration described above in reference to FIGS. 6A and 6B can be advantageous because the blocking and ablation delivery are integrated into the same catheter.

Figure 7:
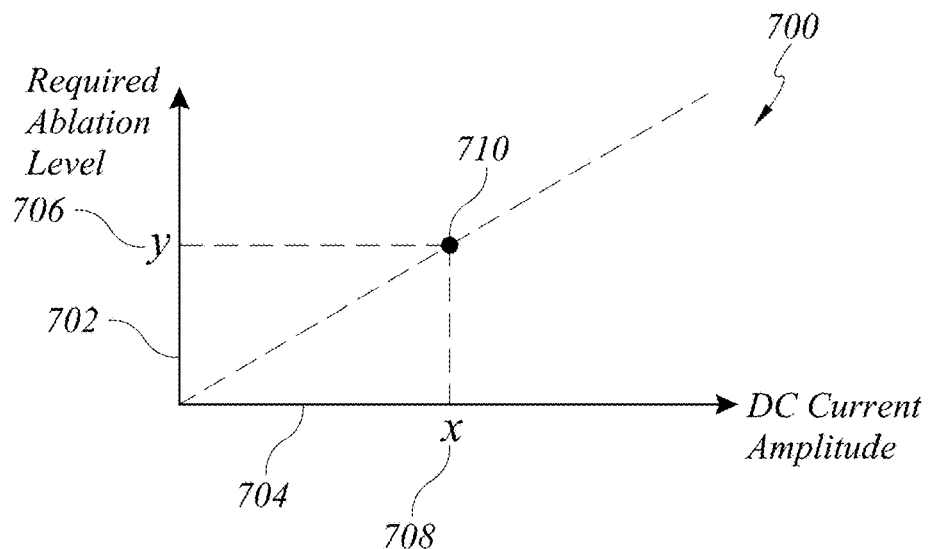
FIG. 7 illustrates an exemplary graph depicting required ablation levels for cardiac tissue as a function of DC current amplitude.

FIG. 7 illustrates an exemplary graph 700 depicting required ablation level as a function of DC current amplitude, which may be correlated. RF, cryo, or other ablation may be delivered at a dose level predicted by the amplitude of DC current required to achieve a desired therapeutic block, e.g., to achieve a desired depth of ablation.

The vertical axis 702 is the required ablation level. The horizontal axis 704 is the DC current amplitude. For example, if a DC amplitude of "x" 708 is required to achieve a desired level of therapeutic effect, then an ablation level (e.g., power and/or duration) of about "y" 706 or higher or lesser is delivered to ablate a similar volume of cardiac tissue.

Figure 8A:
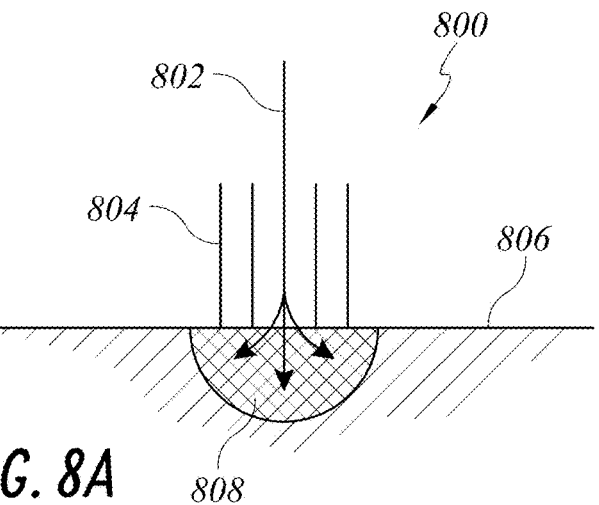
FIG. 8A schematically illustrates an example block mode.

FIG. 8A displays an example block mode 800. Application of the block mode 800 can include applying an integrated catheter 804 to cardiac tissue 806. A current can be applied to cardiac tissue 806, through the blocking conductor 802, which can be an electrode, electrode core, non-fluid conductor, and/or conductive fluid, of integrated catheter 804. In some embodiments, blocking conductor 802 applies blocking DC current to cardiac tissue 806. Cathodic current can be preferably applied over anodic current to directly block the cardiac tissue 506 beneath the blocking conductor 802. Area 808 can depict the blocked volume of cardiac tissue 806 resulting from current flowing from the blocking conductor 802 to the cardiac tissue 806. The current delivered can be "x" 708 depicted in FIG. 7.

Anodic current may also be applied (for example, anodic currents in lower amplitudes may increase the excitability of cardiac tissue in proximity to the electrode to confirm its role in an arrhythmia). In some embodiments, the integrated catheter 804 can be articulable to create bends in the integrated catheter 804 with one or more degrees of freedom. In some embodiments, the integrated catheter 804 can be used to measure bio potentials from cardiac tissue 806. In some embodiments, the blocking conductor 802 can be used to measure bio potentials when not delivering blocking current and/or simultaneous to current delivery.

Figure 8B:
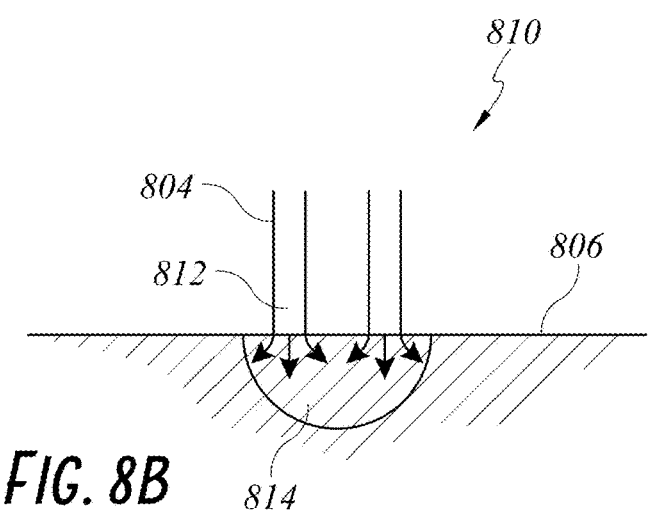
FIG. 8B schematically illustrates an example ablation mode.

FIG. 8B displays an example ablation mode 810. Application of the ablation mode 810 can include applying an integrated catheter 804 to tissue 806. Ablation electrode 812, which can be positioned around the exterior of blocking conductor 802, can ablate cardiac tissue 806. Area 814 can depict the ablated volume of cardiac tissue 806. In some embodiments, volume of area 814 is similar to the volume of area 808. The ablation level can be "y" 706 depicted in FIG. 7.

Figure 9:
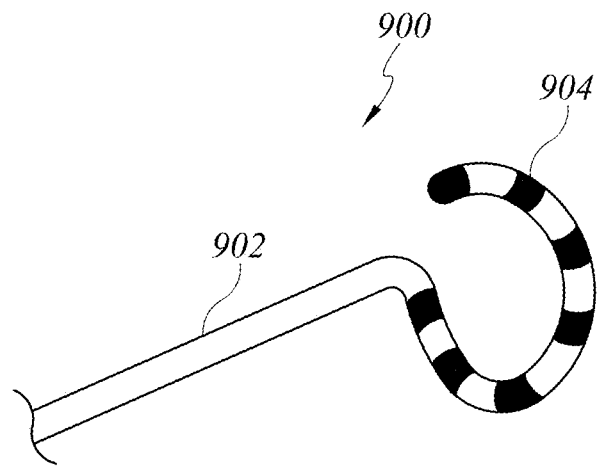
FIG. 9 schematically illustrates an example mapping catheter.

FIG. 9 displays an example mapping catheter 900. The mapping catheter can have an elongate portion 902 that is free of contacts. The mapping catheter 900 can have a series of contacts 904 positioned on and/or near the distal end of the mapping catheter 900. The contacts 904 can be electrodes. In some embodiments, the contacts 904 can have the characteristics of electrodes disclosed herein.

In some embodiments, the contacts 904 surround perimeter portions of catheter 900. In some embodiments, the contacts 904 are equally spaced apart from each other. In some embodiments, the contacts 904 have different spacing between each other. In some embodiments, the contacts 904 are equally sized. In some embodiments, the contacts 904 have different sizes.

In some embodiments, the contacts 904 are made of Ag and/or AgCl. In some embodiments, the contacts 904 are coated, such as an anion exchange membrane. In some embodiments, the contacts 904 are surrounded by a particulate container, which can include a basket, mesh, and/or other covering. In some embodiments, the contacts 904 are both coated, such as via an anion exchange membrane. In some embodiments, the contacts 904 are made of a high charge density material such as TiN or porous TiN.

Current can be delivered through one or more contacts 904 of mapping catheter 900. In some embodiments, DC current and/or AC current is delivered. This may facilitate assessment of whether one or more ablations may be therapeutic. In some embodiments, the contacts 904 can be selected individually or as a plurality, e.g., in multiples to record, block, and/or stimulate.

The contacts 904 may be used to steer current and/or select which portion of cardiac tissue is blocked.

The contacts 904, and any blocking electrode disclosed herein, can have one or more other features, such as ultrasound.

Any catheter disclosed herein can have the form of a mapping catheter, such as mapping catheter 900. The catheter 900, and any catheter disclosed herein, can have flexible elements that enable close contact with the cardiac tissue. The catheter 900, and any catheter disclosed herein, can have addressable DC blocking contacts which can deliver DC to cardiac tissue to provide safe and reversible block of action potentials in the targeted tissue.

Figure 10:
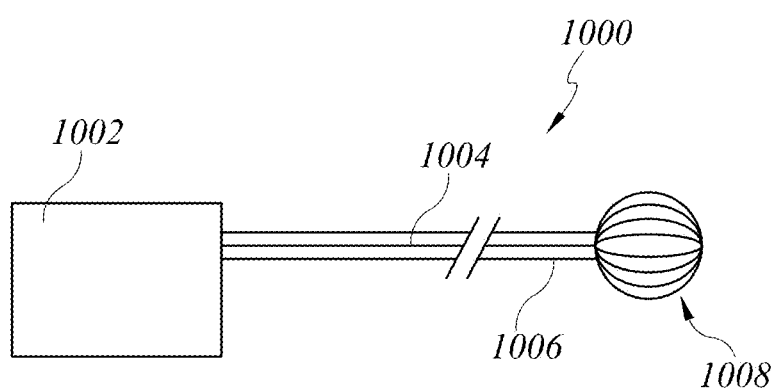
FIG. 10 schematically illustrates an example EP cardiac ablation system using a deformable mesh.

FIG. 10 displays an example system 1000. Example system 1000 can have a generator 1002. Generator 1002 can have the characteristics of the generators disclosed herein. Generator 1002 can be coupled to a catheter 1006. Catheter 1006 can have the characteristics of other catheters disclosed herein.

Catheter 1006 can have a non-fluid conductor 1004 that conducts current from the generator 1002 to contacts, electrodes, and/or wires positioned on meshed member 1008. Meshed member 1008 can be positioned on a distal end of catheter 1006. In some embodiments, meshed member 1008 is deformable upon contact with cardiac tissue. In some embodiments, meshed member 1008 can be a meshed deformable sphere with surface contacts (electrodes) positioned along the outer perimeter. Meshed member 1008 can be a meshed deformable sphere with wires running along the outer perimeter. In some embodiments, the surface contacts and/or wires can be positioned such that they follow a longitudinal or perpendicular to longitudinal direction relative to a major axis of the meshed member 1008. In some embodiments, the surface contacts and/or wires can be individually or separately addressable by the non-fluid conductor 1004.

Figure 11:
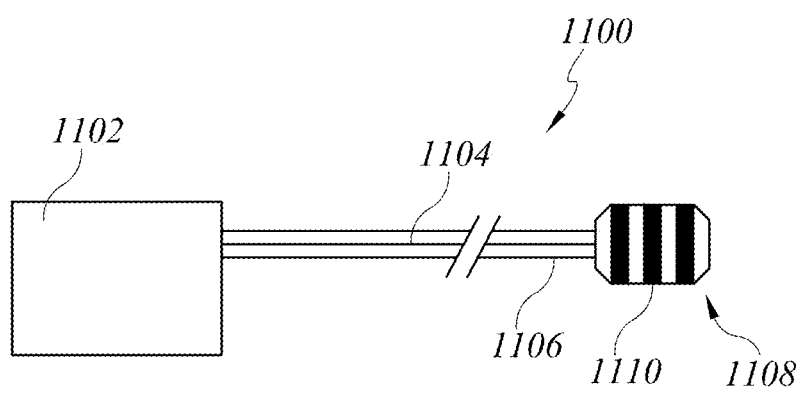
FIG. 11 schematically illustrates an example EP cardiac ablation system using a balloon.

FIG. 11 displays an example system 1100. Example system 1100 can have a generator 1102. Generator 1102 can have the characteristics of the generators disclosed herein. Generator 1102 can be coupled to a catheter 1106. Catheter 1106 can have the characteristics of other catheters disclosed herein.

Catheter 1006 can have a non-fluid conductor 1104 that conducts current from the generator 1102 to conductors 1110 (such as contacts, electrodes, and/or wires) positioned on the exterior of an expandable member, such as a balloon 1008, expandable cage, or the like. The conductors 1110 can be DC blocking electrode contacts. In use, the balloon 1008 can be inflated to press the conductors 1110 against cardiac tissue. In some embodiments, this can facilitate improved current delivery to block cardiac tissue, which can include DC current delivery.

In some embodiments, electrodes and/or contacts, which can include DC blocking electrode contacts, can sense activity in cardiac tissue. This can be applied to any electrodes, contacts, and/or systems disclosed herein. In some embodiments, other sensing contacts may be positioned next to electrodes and/or contacts, which can include DC blocking electrode contacts. This can be applied to any electrodes, contacts, and/or systems disclosed herein.

In some embodiments, the return path of an electrical circuit may be through a distal electrode, and/or a catheter-based electrode. Distal electrode may include a patch electrode placed on the skin, a distal catheter. A distal electrode may be used to allow for a more radically symmetric approximate the volume of tissue ablated with delivery of the ablative modality.

Embodiments of methods for performing an electrophysiology study and ablation procedures are now described. Vascular access can be obtained via percutaneous (e.g., femoral vein, internal jugular vein, radial or brachial artery, etc.) or cut-down techniques. A guidewire can be inserted, and a catheter threaded over the guidewire to the desired location proximate the heart. Imaging, e.g., fluoroscopic or other guidance can be utilized. Sensing electrodes can be moved along the conduction pathways and along and within the endocardium of the heart in some cases to measure electrical activity. The heart, or chambers thereof can then be paced, observing for abnormalities. Arrhythmias can then be provoked via stimulating electrical current and/or proarrhythmic pharmacologic agents (including but not limited to epinephrine, dopamine, phenylephrine, isoproterenol, aminophylline, calcium, atropine, or other agents) in an attempt to induce the arrhythmia, and the sensing electrodes moved to locate the source of the aberrant electrical activity. Non-ablative DC or HFAC can be delivered via electrodes on the catheter to a first target region of cardiac tissue that is believed to be the source of the aberrant electrical activity. If the arrhythmia ceases, that first target region can be efficiently ablated utilizing RF or other ablative techniques such as those disclosed herein. If the arrhythmia does not cease, the first target region is spared, and a second target region treated with non-ablative DC or HFAC. If the arrhythmia ceases, that second target region can be efficiently ablated utilizing RF or other ablative techniques such as those disclosed herein. If the arrhythmia does not cease, the second target region is spared, and the search for a third target region can begin and the process can be repeated.

In some embodiments, non-ablative block can be utilized in connection with a pulmonary vein isolation procedure. After transseptal advancement of a catheter to the ostium of a pulmonary vein, non-ablative block can be directed circumferentially around the ostium of the pulmonary vein. A temporary circumferential ablation zone is thereby produced, which effectively blocks electrical propagation between the pulmonary vein and the left atrium. If the arrhythmia is no longer inducible, a permanent circumferential ablation lesion can be created via ablative modalities including those described elsewhere herein.

In some embodiments, some non-limiting conditions that can be treated with systems and methods as disclosed herein can include but are not limited to atrial fibrillation (such as chronic or paroxysmal atrial fibrillation), long QT syndrome, Wolff-Parkinson-White syndrome, torsades de pointes, premature atrial contractions, wandering atrial pacemaker, multifocal atrial tachycardia, atrial flutter, supraventricular tachycardia (including PSVT), AV nodal reentrant tachycardia, junctional rhythm, junctional tachycardia, premature junctional complex, premature ventricular contractions, accelerated idioventricular rhythm, monomorphic ventricular tachycardia, polymorphic ventricular tachycardia, right ventricular outflow tract tachycardia, and ventricular fibrillation.

Although this disclosure has been described in the context of certain embodiments and examples, it will be understood by those skilled in the art that the disclosure extends beyond the specifically disclosed embodiments to other alternative embodiments and/or uses and obvious modifications and equivalents thereof. In addition, while several variations of the embodiments of the disclosure have been shown and described in detail, other modifications, which are within the scope of this disclosure, will be readily apparent to those of skill in the art. It is also contemplated that various combinations or sub-combinations of the specific features and aspects of the embodiments may be made and still fall within the scope of the disclosure. For example, features described above in connection with one embodiment can be used with a different embodiment described herein and the combination still fall within the scope of the disclosure. It should be understood that various features and aspects of the disclosed embodiments can be combined with, or substituted for, one another in order to form varying modes of the embodiments of the disclosure. Thus, it is intended that the scope of the disclosure herein should not be limited by the particular embodiments described above. Accordingly, unless otherwise stated, or unless clearly incompatible, each embodiment of this invention may comprise, additional to its essential features described herein, one or more features as described herein from each other embodiment of the invention disclosed herein.

Features, materials, characteristics, or groups described in conjunction with a particular aspect, embodiment, or example are to be understood to be applicable to any other aspect, embodiment or example described in this section or elsewhere in this specification unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The protection is not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

Furthermore, certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as a subcombination or variation of a subcombination.

Moreover, while operations may be depicted in the drawings or described in the specification in a particular order, such operations need not be performed in the particular order shown or in sequential order, or that all operations be performed, to achieve desirable results. Other operations that are not depicted or described can be incorporated in the example methods and processes. For example, one or more additional operations can be performed before, after, simultaneously, or between any of the described operations. Further, the operations may be rearranged or reordered in other implementations. Those skilled in the art will appreciate that in some embodiments, the actual steps taken in the processes illustrated and/or disclosed may differ from those shown in the figures. Depending on the embodiment, certain of the steps described above may be removed, others may be added. Furthermore, the features and attributes of the specific embodiments disclosed above may be combined in different ways to form additional embodiments, all of which fall within the scope of the present disclosure. Also, the separation of various system components in the implementations described above should not be understood as requiring such separation in all implementations, and it should be understood that the described components and systems can generally be integrated together in a single product or packaged into multiple products.

For purposes of this disclosure, certain aspects, advantages, and novel features are described herein. Not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than 10% of, within less than 5% of, within less than 1% of, within less than 0.1% of, and within less than 0.01% of the stated amount. As another example, in certain embodiments, the terms "generally parallel" and "substantially parallel" refer to a value, amount, or characteristic that departs from exactly parallel by less than or equal to 15 degrees, 10 degrees, 5 degrees, 3 degrees, 1 degree, 0.1 degree, or otherwise.

Any methods disclosed herein need not be performed in the order recited. The methods disclosed herein include certain actions taken by a practitioner; however, they can also include any third-party instruction of those actions, either expressly or by implication. For example, actions such as "controlling a motor speed" include "instructing controlling of a motor speed."

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, and/or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid state memory chips and/or magnetic disks, into a different state. In some embodiments, the computer system may be a cloud-based computing system whose processing resources are shared by multiple distinct business entities or other users.

The scope of the present disclosure is not intended to be limited by the specific disclosures of preferred embodiments in this section or elsewhere in this specification, and may be defined by claims as presented in this section or elsewhere in this specification or as presented in the future. The language of the claims is to be interpreted broadly based on the language employed in the claims and not limited to the examples described in the present specification or during the prosecution of the application, which examples are to be construed as non-exclusive.

What is claimed is:

1. A method of performing a cardiac electrophysiologic study in a patient, comprising:
   sensing, at a first cardiac target tissue at a heart, electrical activity of the first cardiac target tissue;
   determining that the electrical activity of the first cardiac target tissue has characteristics of interest;
   delivering a first non-ablative direct current to the first cardiac target tissue sufficient to create a reversible conduction block in the first cardiac target tissue, wherein the first non-ablative direct current comprises a frequency of less than about 1 Hz;
   determining an absence of the characteristics of interest based on the electrical activity of the first cardiac target tissue following delivering the first non-ablative direct current; and
   ablating the first cardiac target tissue.

2. The method of claim 1, wherein the characteristics of interest comprise aberrant electrical activity.

3. The method of claim 1, further comprising:
   sensing electrical activity of a second cardiac target tissue; and
   determining that the electrical activity of the second cardiac target tissue has the characteristics of interest.

4. The method of claim 3, further comprising:
   delivering a second non-ablative direct current to the second cardiac target tissue sufficient to create a reversible conduction block in the second cardiac target tissue; and
   observing for the presence of the characteristics of interest following delivering the second non-ablative direct current.

5. The method of claim 4, further comprising:
   ablating the second cardiac target tissue when pathologic arrhythmia is absent following delivering the second non-ablative direct current to the second cardiac target tissue.

6. The method of claim 1, wherein the first non-ablative direct current comprises cathodic direct current cycled with anodic direct current.

7. The method of claim 1, wherein the first non-ablative direct current has an amplitude of less than about 100 mA.

8. The method of claim 1, wherein the first non-ablative direct current has an amplitude of less than about 20 mA.

9. The method of claim 1, wherein the first non-ablative direct current has an amplitude of less than about 10 mA.

10. The method of claim 1, wherein the first non-ablative direct current has an amplitude of less than about 5 mA.

11. The method of claim 1, wherein the first cardiac target tissue comprises myocardium.

12. The method of claim 1, wherein the first cardiac target tissue comprises left or right atrial tissue.

13. The method of claim 1, wherein the first cardiac target tissue comprises left or right ventricular tissue.

14. The method of claim 1, wherein the first cardiac target tissue comprises pulmonary venous tissue.

15. The method of claim 1, for treating an arrhythmia, wherein the arrhythmia comprises atrial fibrillation, atrial flutter, PSVT, or ventricular tachycardia.

16. The method of claim 2, wherein ablating the first cardiac target tissue comprises delivering ablative direct current.

17. The method of claim 2, wherein ablating the first cardiac target tissue comprises delivering RF energy.

18. The method of claim 2, wherein ablating the first cardiac target tissue comprises delivering cryoablation.

19. A method of performing a cardiac electrophysiologic study in a patient, comprising:
   sensing, at a first cardiac target tissue at a heart, electrical activity of the first cardiac target tissue;
   delivering a non-ablative electrical current to the first cardiac target tissue sufficient to create a reversible conduction block in the first cardiac target tissue, wherein the first non-ablative electrical current comprises a frequency of less than about 1 Hz;
   determining an absence of aberrant electrical activity of the patient's heart following delivering the non-ablative electrical current; and
   ablating the first cardiac target tissue.

20. The method of claim 19, wherein the non-ablative electrical current comprises HFAC.

21. The method of claim 19, wherein the non-ablative electrical current comprises direct current.

22. A method of performing a cardiac electrophysiologic study in a patient, comprising:
   sensing, at a heart, electrical activity of a first cardiac target tissue;
   determining that the electrical activity of the first cardiac target tissue has a characteristic of interest;
   delivering a non-ablative current to the first cardiac target tissue sufficient to create a reversible conduction block in the first cardiac target tissue, wherein the non-ablative current comprises a frequency of less than about 1 Hz;
   determining an absence of the characteristic of interest following delivering the non-ablative current; and
   ablating the first cardiac target tissue.

23. The method of claim 22, wherein the non-ablative electrical current comprises direct current.

* * * * *